United States Patent [19]

Boss

[11] Patent Number: 4,770,284

[45] Date of Patent: Sep. 13, 1988

[54] APPARATUS FOR TRANSPORTING FOLDED SHEETS

[75] Inventor: Heinz Boss, Strengelbach, Switzerland

[73] Assignee: Grapha-Holding AG, Hergiswil, Switzerland

[21] Appl. No.: 833,331

[22] Filed: Feb. 25, 1986

[30] Foreign Application Priority Data

Mar. 7, 1985 [CH] Switzerland ........................ 01040/85

[51] Int. Cl.⁴ ........................ B65G 47/00

[52] U.S. Cl. ........................ 198/339.1; 198/606; 198/644; 270/12; 270/37

[58] Field of Search ........................ 198/339.1, 606, 644, 198/576, 735, 817; 227/44, 99, 103; 270/12, 37, 53, 54, 58

[56] References Cited

U.S. PATENT DOCUMENTS

| | | | |
|---|---|---|---|
| 1,614,715 | 1/1927 | Christensen | 198/644 |
| 2,541,367 | 2/1951 | Kitcat | 198/644 |
| 3,071,237 | 1/1963 | Powell | 198/576 |
| 3,384,097 | 5/1968 | Meeker et al. | 198/735 |
| 3,658,318 | 4/1972 | Bunting et al. | 270/53 |
| 3,718,939 | 3/1973 | Mebus | 198/576 |
| 3,786,979 | 1/1974 | Muller | 227/44 |
| 4,438,702 | 3/1984 | Rhodes | 198/606 |
| 4,493,482 | 1/1985 | Valenti et al. | 270/12 |

*Primary Examiner*—Joseph E. Valenza
*Attorney, Agent, or Firm*—Peter K. Kontler

[57] ABSTRACT

Apparatus for transporting folded sheets has one or two pairs of chain conveyors whose horizontal upper reaches define two spaced-apart portions of a first path for the transport of successive folded sheets of a series of sheets in such a way that the sheets ride on the pairs of conveyors in inverted positions (with the backs on top). An additional chain conveyor has a horizontal upper run defining a second horizontal path between the first and second portions of the first path to transfer the sheets from the first to the second portion of the first pair. The additional chain conveyor advances successive sheets along a stationary ramp which pivots the panels of the sheets apart so that the thus exposed inner sides of the panels are accessible for the application of printed information, labels or the like. The speed of the additional conveyor can slightly exceed the speed of the other chain conveyor or conveyors.

23 Claims, 4 Drawing Sheets

APPARATUS FOR TRANSPORTING FOLDED SHEETS

BACKGROUND OF THE INVENTION

The present invention relates to apparatus for transporting folded sheets in bookbinding, newspaper printing and analogous plants. More particularly, the invention relates to improvements in apparatus for transporting folded sheets past one or more treating stations.

It is known to transport a series of successive folded sheets on the saddles of one or more endless chain conveyors and to provide such conveyor or conveyors with pushers which positively advance the sheets along a preselected path. The sheets ride on the saddles so that each sheet resembles the inverted letter V. Reference may be had to the commonly owned U.S. Pat. No. 3,807,547 to Hans Müller or to numerous other United States applications and patents of the assignee. Each sheet can constitute one component of or an entire newspaper, periodical, signature, pamphlet or brochure which must be provided with the name and address prior to mailing or shipment to a customer or subscriber. For example, the name and address of the customer or subscriber can be applied by means of a so-called ink jet or it can be applied first to a card or label which is to be pasted, stapled or otherwise affixed to a folded sheet.

A drawback of presently known apparatus for the transport of folded sheets is that all parts of the sheets thereon are not readily accessible for the application of information, cards, labels or the like. This applies especially for the regions of the backs which connect the mutually inclined panels of the sheets to each other.

OBJECTS AND SUMMARY OF THE INVENTION

An object of the invention is to provide a novel and improved apparatus which can transport a series of folded sheets in such a way that all or nearly all portions of successive sheets are readily accessible for treatment at one or more stations along the path or paths of the sheets.

Another object of the invention is to provide a transporting apparatus which is not only compact but is also relatively simple even though it enables an imprinting device, a label applicator or a like unit to reach any selected portion of each of a series of closely adjacent folded sheets.

A further object of the invention is to provide a transporting apparatus whch can be installed in existing printing, bookbinding, gathering, and like machines.

An additional object of the invention is to provide a novel and improved method of transporting, deforming and otherwise treating successive sheets of a series of folded sheets on one or more endless belt or chain conveyors.

A further object of the invention is to provide a novel and improved system of conveyors for use in the above outlined apparatus and for the practice of the above outlined method.

Still another object of the invention is to provide novel and improved means for gripping and confining successive sheets of a series of folded sheets during transport past one or more treating units.

An additional object of the invention is to provide the apparatus with novel and improved means for deforming and treating successive sheets of a series of folded sheets in a small area and at the rate at which such sheets issue from a folding, gathering or other machine.

A further object of the invention is to provide the apparatus with novel and improved means for treating a wide variety of sheets including large, small, thick, thin, readily flexible and relatively stiff sheets.

The improved apparatus is utilized to transport a series of folded sheets of the type wherein two panels are connected to each other by an elongated back. The apparatus comprises first conveyor means for supporting the folded sheets from inside so that the panels of the sheets extend downwardly (i.e., that the backs of the sheets ride on the conveyor means). The first conveyor means defines for the sheets a first path having an elongated first portion and an elongated second portion which is at least substantially aligned with and is spaced apart from the first portion. The apparatus further comprises second conveyor means defining for the sheets a second path which extends between the two portions of the first path and arranged to support the sheets from inside (the same as the first conveyor means), and means for pivoting at least one panel of each sheet about the respective back and away from the other panel during travel of the sheet along the second path.

The first conveyor means can comprise two endless flexible conveyors (e.g., two endless chain conveyors) having parallel stretches or runs which define the two portions of the first path. The paths are or can be substantially horizontal, and the first conveyor means can further comprise means (e.g., suitably dimensioned and positioned sprocket wheels) for deflecting portions of the runs downwardly to a level below the second path intermediate the two portions of the first path.

The first conveyor means can comprise a pair of endless flexible conveyors (e.g., the aforementioned chain conveyors) having runs which define at least one portion of the first path and are disposed in two parallel planes. Such endless conveyors are preferably provided with first pushers which advance successive sheets of the series along the one portion of the first path. The pushers of one of the endless conveyors are spaced apart from and aligned with the pushers of the other endless conveyor as considered transversely of the first path, and the second conveyor means of such apparatus can comprise an additional endless flexible conveyor (e.g., a chain conveyor) having an elongated run which defines the second path and is disposed in a third plane between the two parallel planes. The second conveyor means is provided with second pushers which serve to advance successive sheets of the series from the first to the second portion of the first path, and the second pushers extend into the space between the pushers of the two endless conveyors of the first conveyor means during travel of the second pushers at the respective end of the one portion of the first path (i.e., adjacent to the respective end of the second path).

The apparatus can further comprise a preferably stationary guide for the elongated run of the endless conveyor forming part of the second conveyor means. For example, the guide can include a substantially plate-like member which is disposed in a substantially vertical plane and has a top edge face provided with a groove for the elongated run of the endless conveyor forming part of the second conveyor means.

The apparatus can further comprise third conveyor means (e.g., an endless chain or belt conveyor) extending along the second path opposite the second conveyor means so that the backs of sheets which advance along the second path are confined between the second and third conveyor means. If the paths are substantially horizontal, the third conveyor means is located at a level above the second path.

Still further, the apparatus can comprise means for treating the panels of sheets downstream of the pivoting means, as considered in the direction of advancement of sheets along the first and second paths. The treating means can comprise means for applying information (e.g., printed matter) to the sheets and/or means for applying labels or the like to successive sheets of the series.

The pivoting means can comprise a ramp having a cam face along which the panels of successive sheets of the series slide during travel along a portion of the second path. The pivoting means can include means for pivoting at least one panel of each sheet into a substantially horizontal plane.

The conveyor of the second conveyor means and/or the conveyors of the first conveyor means are preferably designed to support the sheets in such a way that the sheets which ride on the respective conveyor or conveyors have the shape of an inverted V.

Two endless flexible conveyors of the first conveyor means can be designed to define the first and second portions of the first path. Such endless conveyors preferably include preferably horizontal first portions which define the first portion of the first path, preferably horizontal second portions which define the second portion of the first path, and third portions which are disposed at a level below the first and second portions. The second path is then disposed at a level above the third portions of the two endless conveyors. Such conveyors are preferably disposed in two parallel vertical planes, and the second conveyor means can comprise an endless belt or chain conveyor disposed in a third vertical plane substantially midway between the two parallel vertical planes.

The pivoting means is or can be stationary and is preferably designed to gradually pivot one or both panels of each of the series of sheets. The aforementioned pushers can be provided on or they can be separably connected to saddles which are provided on the respective conveyor means and support the sheets in the regions of the backs of sheets.

The novel features which are considered as characteristic of the invention are set forth in particular in the appended claims. The improved transporting apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
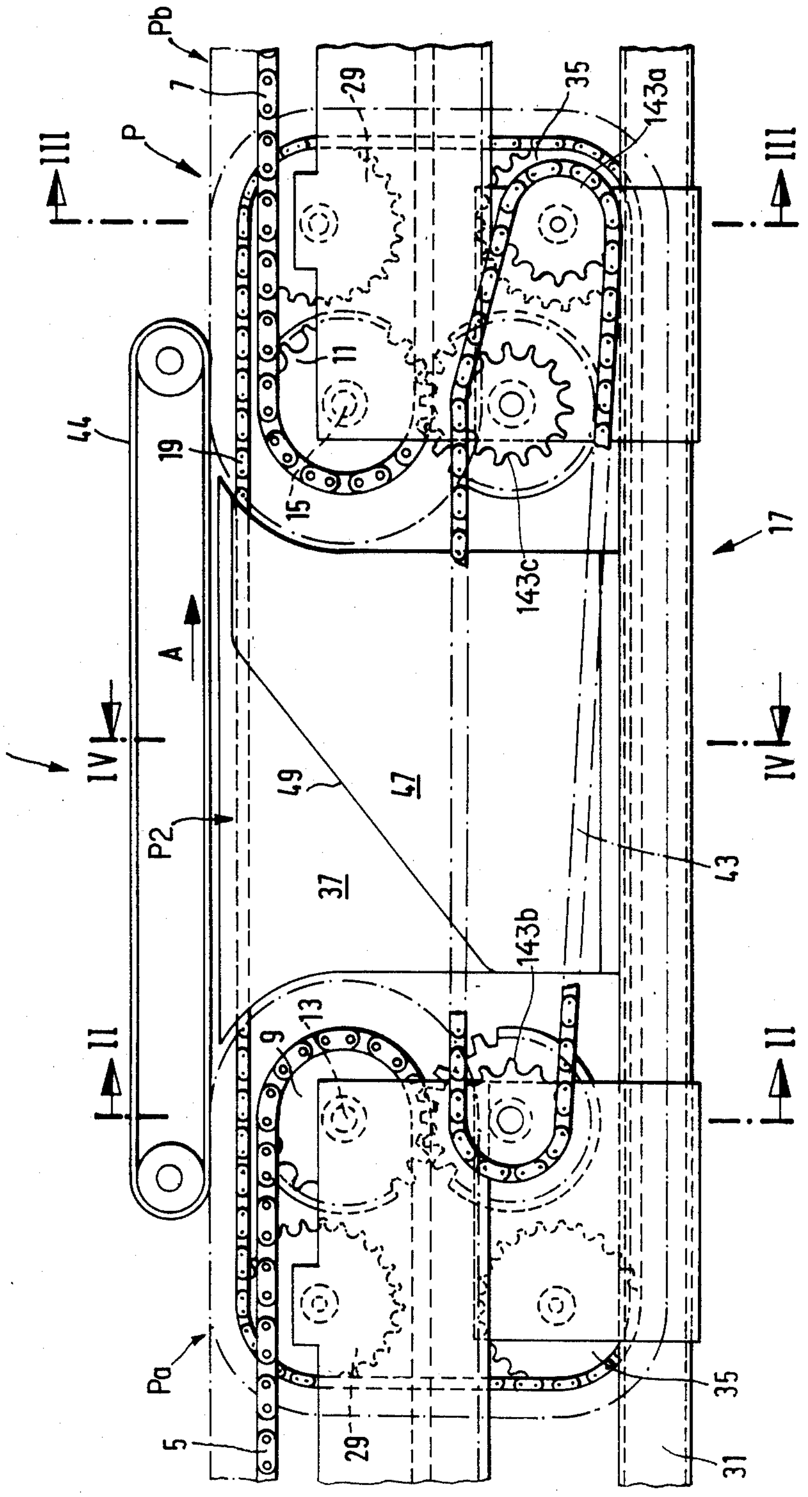
FIG. 1 is a fragmentary schematic elevational view of a transporting apparatus which embodies one form of the invention.

The transporting apparatus 1 which is shown in FIGS. 1 to 4 comprises first conveyor means including a first pair of endless chain conveyors 5 and a second pair of endless chain conveyors 7. The upper reaches or runs of the chain conveyors 5 and 7 are substantially horizontal and define a first path P having an elongated first portion Pa (defined by the upper reaches or runs of the conveyors 5) and an elongated second portion Pb (defined by the upper reaches or runs of the conveyors 7). The path portion Pa is aligned with the path portion Pb, and such portions are spaced apart from each other so as to provide room for the upper reach or run of an additional endless chain conveyor 19 which forms part of second conveyor means and defines a second elongated path P2. The chain conveyors 5, 7 and 19 serve to transport a series of folded sheets 3 each of which has an elongated back 23 and two panels 25 extending downwardly from the respective back during travel of the sheets along the path portion Pa (in the direction of arrow A).

One of the chain conveyors 5 is coplanar with one of the conveyors 7, and the other of the conveyors 5 is coplanar with the other conveyor 7. The vertical planes of the coplanar chain conveyors 5, 7 are disposed at the opposite sides of and are equidistant from the vertical plane of the chain conveyor 19.

The chain conveyors 5 are trained over twin sprocket wheels 9 (one shown in each of FIGS. 1 and 2), and the chain conveyors 7 are trained over similar twin sprocket wheels 11. The sprocket wheels 9 and 11 which are shown in FIG. 1 are respectively mounted on horizontal shafts 13 and 15 which are disposed upstream and downstream of a space provided between the pairs of conveyors 5, 7 for a treating station 17 for successive sheets 3. The treating station 17 accommodates an apparatus 4 (e.g., a so-called ink jet which is shown schematically in FIG. 4) serving to apply information in the form of letters, numerals and/or other indicia to the inner side of one panel 25 of each sheet 3 during travel of the sheet along the path P2, and/or an apparatus 6 (e.g., a dispenser of cards, labels or the like) which affixes cards or labels to successive sheets 3 before they reach the second portion Pb of the first path P. Each card or label can carry the name and address of a customer or subscriber.

Figure 2:
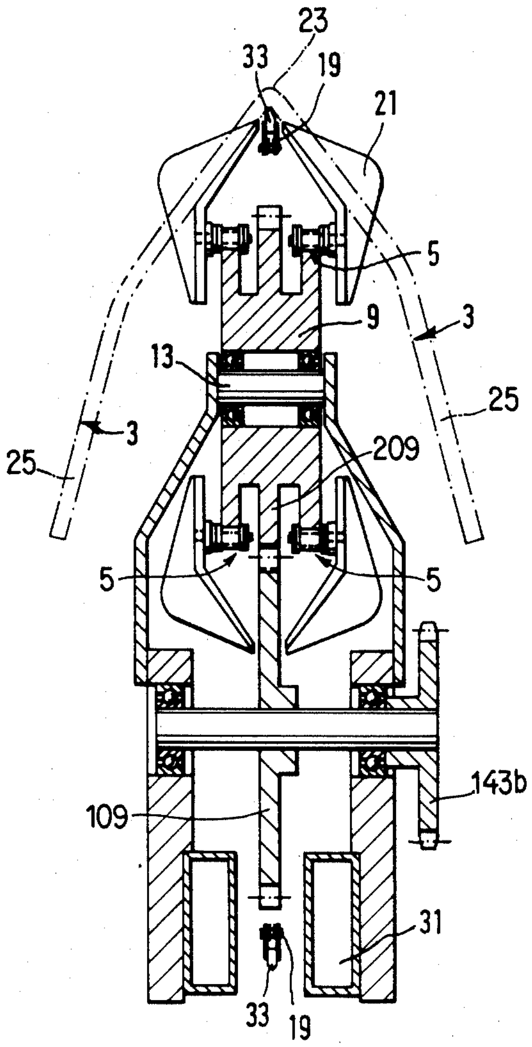
FIG. 2 is an enlarged transverse vertical sectional view as seen in the direction of arrows from the line II—II of FIG. 1.
Figure 3:
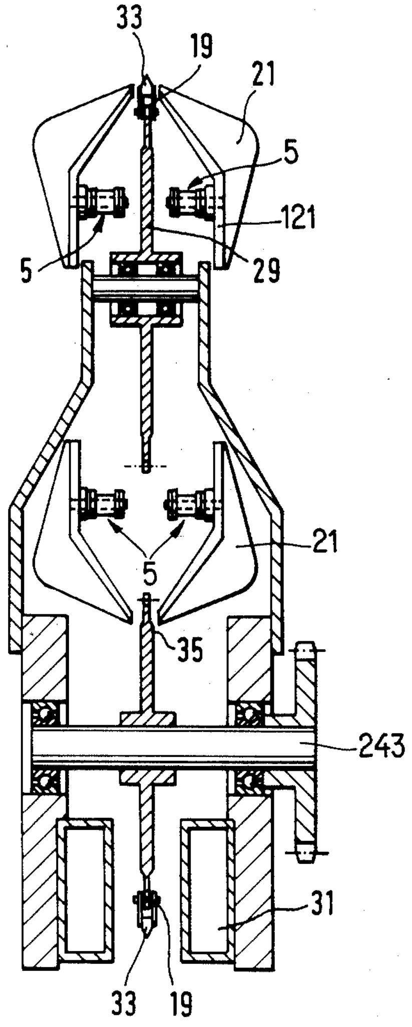
FIG. 3 is an enlarged transverse vertical sectional view as seen in the direction of arrows from the line III—III of FIG. 1.

The additional chain conveyor 19 is or can be driven at a speed slightly exceeding the speed of the chain conveyors 5 and 7. The speed of the chain conveyors 5 may but need not necessarily match the speed of the chain conveyors 7. As can be seen in FIGS. 2 and 3, the width of the chain conveyor 19 is or can be a small fraction of the width of a chain conveyor 5 or 7.

Each of the chain conveyors 5, 7 carries a plurality of equidistant pushers 21 which serve to positively advance the sheets 3 along the portions Pa and Pb of the first path P. Analogous pushers 33 are provided on the chain conveyor 19 to positively advance successive sheets 3 along the second path P2 from the path portion Pa toward the path portion Pb. Each pusher 21 on a chain conveyor 5 or 7 is aligned with a pusher 21 on the adjacent conveyor 5 or 7. As can be seen in FIGS. 2 and 3, the pushers 21 form part of or are connected with saddles 121 on which the sheets 3 ride in such a way that the saddles engage the respective sheets from inside, i.e., each sheet 3 on the pair of conveyors 5 resembles the inverted letter V and its back 23 is located at a level above the respective panels 25.

The chain conveyor 19 is trained over two thin disc-shaped upper sprocket wheels 29 and over two thin disc-shaped lower sprocket wheels 35. The upper reach of this chain conveyor extends between the sprocket wheels 29. The shafts for the sprocket wheels of the chain conveyors 5, 7 and 19 are mounted in a stationary frame 31. The upper reach or run of the chain conveyor 19 is disposed at a level above the upper runs of the chain conveyors 5 and 7 (see FIGS. 2 and 3) because the pushers 21 and the saddles 121 extend well above the upper runs of the conveyors 5 and 7. FIG. 3 shows that the sprocket wheels 29 for the chain conveyor 19 are disposed in a plane (namely in the aforementioned third vertical plane) which is flanked by and is spaced apart from the vertical planes of the chain conveyors 5.

The transporting apparatus 1 preferably further comprises a stationary guide including a substantially plate-like metallic member 37 (see FIGS. 1 and 4) whose top edge face has an elongated groove 39 for the upper run of the chain conveyor 19.

The means for driving the chain conveyor 19 comprises an endless chain 43 which is trained over three sprocket wheels 143 (FIGS. 1, 2 and 3) one (**143*a*) of which drives one of the sprocket wheels 35 by way of its shaft 243 and another (143*b*) of which drives one of the sprocket wheels 9 by way of a train of gears 109, 209. The sprocket wheel 143*a*, 143*b* or 143*c* is driven by a motor or transmission, not shown. A second gear train 109, 209 is provided to receive torque from the sprocket wheel 143*c* and to drive one of the sprocket wheels 11 for the chain conveyors 7. The transmission ratio of the two gear trains determines the ratio of the speed of the chain conveyor 19 to the speed of the pairs of chain conveyors 5 and 7**.

The transporting apparatus 1 further comprises third conveyor means including an endless belt conveyor 44 whose lower reach or run is adjacent to the upper run of the chain conveyor 19 at a level above the second path P2 and which cooperates with the chain conveyor 19 to confine the backs 23 of successive sheets 3 while the sheets travel along the second path P2. The conveyor 44 is preferably driven in synchronism with the chain conveyor 19 in a manner not specifically shown in the drawing. The conveyor 44 can be made of, or it may be coated with, a relatively soft material to avoid the application of excessive pressure to the backs 23 of sheets 3 which ride on the upper run of the chain conveyor 19. The conveyors 19 and 44 prevent undesirable shifting of sheets 3 during the application of printed matter and/or lables at the treating station 17.

Figure 4:
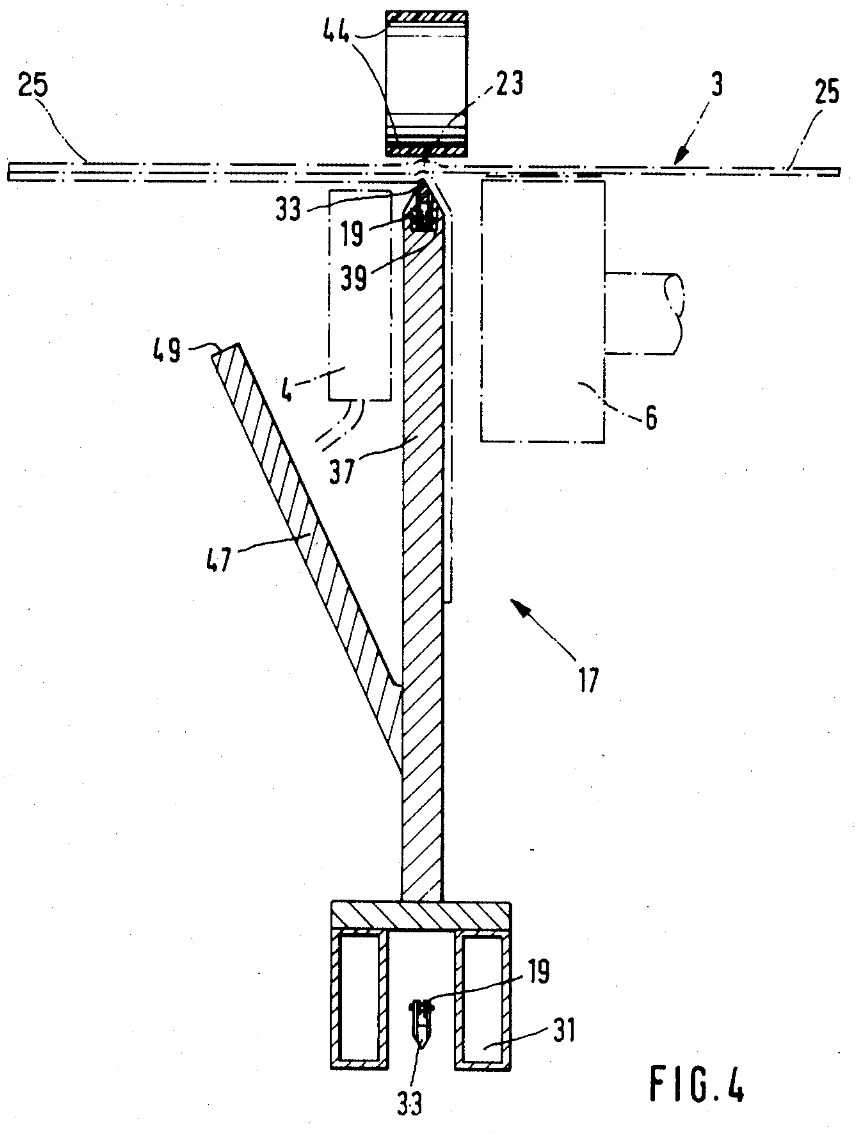
FIG. 4 is an enlarged transverse vertical sectional view as seen in the direction of arrows from the line IV—IV of FIG. 1.

In order to allow for convenient application of printed matter, labels or the like to the inner or outer sides of the panels 25, the transporting apparatus 1 comprises a pivoting or spreading device 47 which constitutes a stationary ramp mounted on the plate-like member 37 of the aforementioned guide and having an upper edge face or cam face 49 which gradually pivots the left-hand panel 25 of the sheet 3 shown in FIG. 4 so that this panel is horizontal or nearly horizontal not later than when it reaches the applicator 4. A similar or identical ramp (not shown) is or can be provided for the other panel 25 of each sheet 3 which advances along the second path P2 to pivot such panel along the respective back 23 into or close to a substantially horizontal plane so as to allow for convenient application of a label which is supplied by the dispenser 6. Each pivoting or spreading device 47 can consist of a metallic sheet material and can constitute an integral part of the guide 37.

An important advantage of the transporting apparatus 1 is that it affords access to all portions of the inner sides of the panels 25, even immediately adjacent to the respective backs 23. One or more treating units can be disposed at a level above the panels 25 which are shown in FIG. 4 if the nature of desired treatment and/or of one or more applicators is such that they can readily apply information, labels or the like to the exposed sides of the panels while the exposed sides face upwardly. It is possible to provide one or more units which apply information or the like to the inner side of one panel 25 of each sheet 3 and one or more units which apply information or the like to the outer side of the other panel of each sheet or to the outer side of the one panel.

An advantage of the provision of two discrete pairs of endless chains is that the width of the space for the treating station 17 can be selected practically at will. Moreover, it is possible to employ commercially available endless chains of reasonable length. The saddles 121 and the pushers 21 can form integral or removable and adjustable parts of the chain conveyors 5 and 7. The same applies for the pushers 33 of the chain conveyor 19.

The guide including the plate-like member 37 is optional but desirable and advantageous because it ensures that the sheets 3 which travel from the portion Pa toward the portion Pb of the first path P advance along an accurately determined second path P2. The surface bounding the groove 39 of the member 37 can be in continuous or sporadic contact with the upper run of the chain conveyor 19.

The conveyor 44 also constitutes an optional but desirable and advantageous feature of the improved apparatus, especially if the sheets are transported at a high speed.

Figure 5:
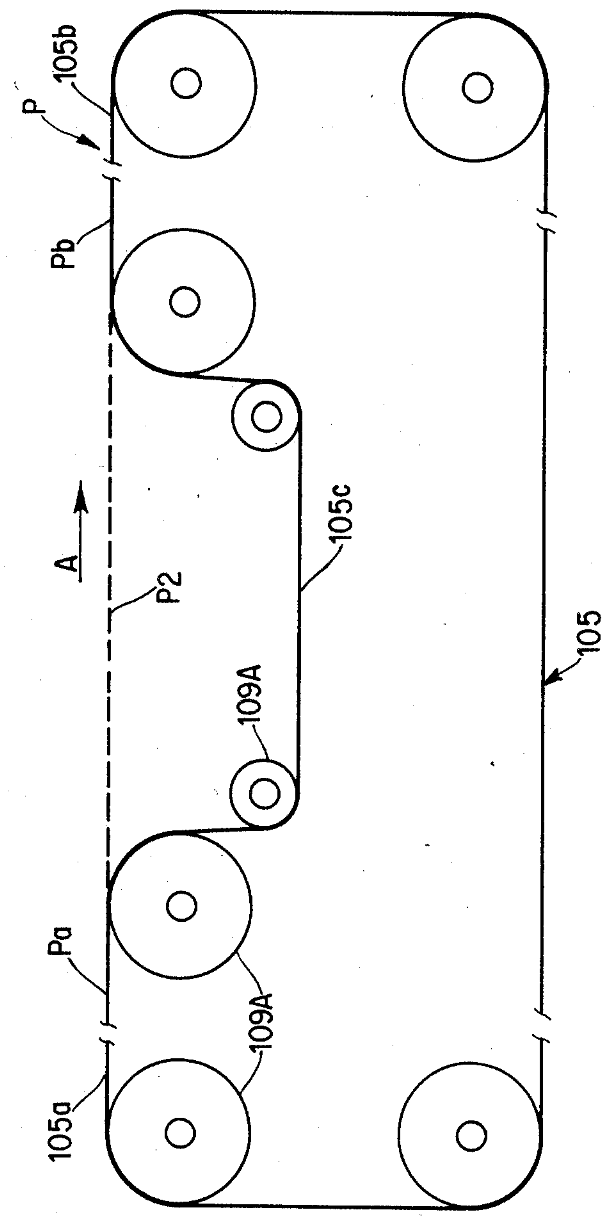
FIG. 5 is a schematic elevational view of first conveyor means in a modified apparatus.

FIG. 5 shows a portion of a modified transporting apparatus wherein the first conveyor means comprises only two endless chain conveyors 105 (one shown). These chain conveyors are mounted in two parallel vertical planes and each such conveyor includes an upper reach or run having a first horizontal portion **105*a* defining the portion Pa of the first path P, a second horizontal portion 105*b* which is aligned with the first portion 105*a* and defines the portion Pb of the first path, and a third portion 105*c* which is disposed between the portions 105*a*, 105*b* at a level below the second path P2 (indicated by a broken line). The portion 105*c* includes two sections which extend at right angles to the portions 105*a*, 105*b* and an intermediate section which is parallel to the portions 105*a*, 105*b*. The sprockets for the illustrated chain conveyor 105 are shown at 109A. The second path P2 is again defined by an additional conveyor, such as the chain conveyor 19, which forms part of a second conveyor means and is disposed between the vertical planes of the conveyors 105**.

The pushers on portions **105*a*, 105*b* of the chain conveyors 105 can transport successive sheets along stationary saddles in the form of rails or the like. The apparatus which embodies endless chain conveyors of the type shown in FIG. 5** exhibits the advantage that its first conveyor means comprises fewer parts and that it is not necessary to provide any specially designed means for synchronizing the movements of one pair of conveyors with the movements of the other pair of conveyors.

The chain conveyors can be replaced with belt conveyors without departing from the spirit of the invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for transporting a series of folded sheets of the type having two panels and an elongated back which connects the panels to each other, comprising first conveyor means for supporting the folded sheets from inside so that the panels of such sheets extend downwardly, said conveyor means defining for the sheets a first path having an elongated first portion and an elongated second portion which is substantially aligned with and spaced apart from said first portion, said first portion having a downstream end and said second portion having an upstream end which faces said downstream end, and said first conveyor means including two laterally spaced parts each of which engages one panel of a sheet, said parts being arranged to be deflected out of said first path at said downstream end and into said path at said upstream end; and second conveyor means laterally positioned between said parts of said first conveyor means and comprising an endless conveyor defining for the sheets a second path extending between the portions of said first path, said endless conveyor being arranged to transport the sheets past a working station, to engage the backs of the sheets from below, to support the sheets of said series from inside and extending from said first portion to said second portion of said first path.

2. The apparatus of claim 1, wherein said first conveyor means comprises two endless flexible conveyors having parallel runs which define said portions of the first path.

3. The apparatus of claim 2, wherein said paths are substantially horizontal and said first conveyor means further comprises means for deflecting portions of said runs downwardly to a level below said second path intermediate said portions of the first path.

4. The apparatus of claim 1, wherein said parts comprise a pair of endless flexible conveyors having runs which define at least one portion of said first path and are disposed in two parallel planes.

5. The apparatus of claim 4, wherein said endless flexible conveyors of said parts have first pushers for advancing successive sheets of said series along said one portion of the first path, the pushers of one of said endless flexible conveyors being spaced apart from the pushers of the other of said endless flexible conveyors as considered transversely of said first path, said endless conveyor of said second conveyor means having a run defining said second path and disposed in a third plane between said parallel planes, said endless conveyor of said second conveyor means having second pushers for advancing successive sheets of said series from the first to the second portion of said first path and said second pushers extending between the pushers of said endless flexible conveyors of said pair during travel of said second pushers at the respective end of said one portion of the first path.

6. The apparatus of claim 1, wherein said endless conveyor has an elongated run which defines said second path; and further comprising a guide for said run.

7. The apparatus of claim 6, wherein said guide includes a plate-like member disposed in a substantially vertical plane and having a top edge face provided with a groove for said run.

8. The apparatus of claim 1, further comprising third conveyor means extending along said second path opposite said second conveyor means so that the backs of sheets advancing along said second path are confined between said second and third conveyor means.

9. The apparatus of claim 8, wherein said paths are substantially horizontal and said third conveyor means is disposed at a level above said second path.

10. The apparatus of claim 1, further comprising means for pivoting at least one panel of each sheet in said second path about the respective back and away from the other panel during travel of the sheet along said second path.

11. The apparatus of claim 10, further comprising means for treating the panels of the sheets downstream of said pivoting means as considered in the direction of travel of sheets along said paths.

12. The apparatus of claim 11, wherein said treating means includes means for applying information to the sheets.

13. The apparatus of claim 11, wherein said treating means includes means for applying labels or the like to successive sheets of said series.

14. The apparatus of claim 10, wherein said pivoting means comprises a ramp having a cam face along which the panels of successive sheets of said series slide during travel along said second path.

15. The apparatus of claim 10, wherein said pivoting means includes means for pivoting the one panel of each of said series of sheets into a substantially horizontal plane.

16. The apparatus of claim 1, wherein at least one of said conveyor means includes at least one endless chain.

17. The apparatus of claim 1, wherein said parts include two endless conveyors whereon the sheets of said series ride so that each thereof has the shape of an inverted V.

18. The apparatus of claim 1, wherein said parts comprise two endless flexible conveyors each including an elongated upper run having a substantially horizontal first portion, a substantially horizontal second portion and a third portion disposed between and at a level below said horizontal first and second portions, the first and second portions of said runs defining the first and second portions of said first path, respectively, and said second path being disposed at a level above the third portions of said runs.

19. The apparatus of claim 18, wherein said endless flexible conveyors are disposed in two parallel vertical planes and said second conveyor means is disposed in a third vertical plane substantially midway between said parallel planes.

20. The apparatus of claim 10, wherein said pivoting means is stationary and includes means for gradually pivoting both panels of each of said series of sheets.

21. The apparatus of claim 1, wherein said conveyor means comprise means for pushing the sheets along the respective paths and saddles for supporting the sheets in the regions of the respective backs.

22. The apparatus of claim 1, wherein said second conveyor means overlaps said first and second portions of said first path.

23. The apparatus of claim 1, wherein said second conveyor means is located in a substantially vertical plane.

* * * * *